US012730365B2

(12) United States Patent
Momose

(10) Patent No.: US 12,730,365 B2
(45) Date of Patent: Sep. 8, 2026

(54) PROJECTION DEVICE

(71) Applicant: SEIKO EPSON CORPORATION, Tokyo (JP)

(72) Inventor: Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 505 days.

(21) Appl. No.: 18/183,697

(22) Filed: Mar. 14, 2023

(65) Prior Publication Data

US 2023/0296970 A1 Sep. 21, 2023

(30) Foreign Application Priority Data

Mar. 15, 2022 (JP) ................................ 2022-039991

(51) Int. Cl.

*G03B 21/14* (2006.01)
*G03B 21/16* (2006.01)
*G03B 21/20* (2006.01)

(52) U.S. Cl.

CPC ........... *G03B 21/145* (2013.01); *G03B 21/16* (2013.01); *G03B 21/208* (2013.01)

(58) Field of Classification Search

CPC ..... G03B 21/145; G03B 21/16; G03B 21/208
USPC ........................................................ 353/52
See application file for complete search history.

(56) References Cited

U.S. PATENT DOCUMENTS 7,988,299 B2 * 8/2011 Urakawa .............. H04N 9/3141 353/42
10,473,966 B2 * 11/2019 Yuuki ............... G02F 1/133385
2008/0037271 A1 2/2008 Grace et al.
2009/0021458 A1 1/2009 Drazic et al.
2011/0242506 A1 10/2011 Uchiyama et al.
2014/0022463 A1 * 1/2014 Kinebuchi ........... H04N 9/3111 348/759
2015/0042560 A1 * 2/2015 Cai ......................... G06F 3/017 353/81
2016/0041395 A1 * 2/2016 Yajima ................ G02B 27/017 359/630
2017/0237935 A1 * 8/2017 Totani ................ G02B 27/0176 348/802

FOREIGN PATENT DOCUMENTS

CN 205720899 U * 11/2016
EP 1396981 A1 3/2004
GB 213435 A * 4/1924 ............. F21V 19/00
JP 2001-021992 A 1/2001
JP 2004-046027 A 2/2004
JP 2008-517327 A 5/2008

(Continued)

OTHER PUBLICATIONS

Abstract of GB_213435 (Year: 2025).*
Translation of CN_205720899_U (Year: 2025).*

*Primary Examiner* — Jerry L Brooks
(74) *Attorney, Agent, or Firm* — Oliff PLC

(57) ABSTRACT

Included are a display panel configured to emit light from a plurality of light-emitting elements in a Z direction, a projection lens configured to project the light emitted from the display panel in the Z direction, a power supply unit configured to supply power to the display panel, and a housing having a tubular shape, the housing accommodating the power supply unit, the display panel, and the projection lens in this order along the Z direction.

5 Claims, 8 Drawing Sheets

(56) References Cited

FOREIGN PATENT DOCUMENTS

| | | | |
|---|---|---|---|
| JP | 2008-167410 | A | 7/2008 |
| JP | 2009-545776 | A | 12/2009 |
| JP | 2010-041345 | A | 2/2010 |
| JP | 2010-139613 | A | 6/2010 |
| JP | 2011-227300 | A | 11/2011 |
| JP | 2013-142845 | A | 7/2013 |
| JP | 2015-032743 | A | 2/2015 |

* cited by examiner

Z X Y

10

100

120

150

/Gwr(1)

/Gwr(2)

/Gwr(m-1)

/Gwr(m)

112

112

R G B R G B 11 11 11

114 114 114

Vd(1) Vd(2) Vd(3) Vd(3n-2) Vd(3n-1) Vd(3n)

13

140

Sync

Vid

Vdata

15

151

152

PROJECTION DEVICE

The present application is based on, and claims priority from JP Application Serial Number 2022-039991, filed Mar. 15, 2022, the disclosure of which is hereby incorporated by reference herein in its entirety.

BACKGROUND

1. Technical Field

The present disclosure relates to, for example, a projection device.

2. Related Art

In some uses of a projection device that enlarges and projects an image generated at a display panel to a screen or the like, the projection device is demanded to be small and portable. In order to cope with such uses, a projection device is conceivable that refracts a polarized component emitted from a light engine for supplying a light beam, supplies the polarized component to a display panel for forming an image, enlarges, by using a lens, the image formed at the display panel, and projects the image (see, for example, JP-A-2009-545776).

The projection device described in JP-A-2009-545776 can be made portable to some extent. However, because a light emitter and the light engine are arranged at substantially 90 degrees with a refractive body as a center, there is a problem in that further miniaturization is difficult.

SUMMARY

A projection device according to an aspect of the present disclosure includes a display panel configured to emit light from a plurality of light-emitting elements in a predetermined direction, a projection lens configured to project the light emitted from the display panel in the predetermined direction, a power supply unit configured to supply power to the display panel, and a housing having a tubular shape, the housing accommodating the power supply unit, the display panel, and the projection lens in this order along the predetermined direction.

DESCRIPTION OF EXEMPLARY EMBODIMENTS

A display panel of each embodiment of the present disclosure will be described below with reference to the accompanying drawings.

In each of the drawings, dimensions and scale of each part are appropriately different from actual ones.

Moreover, the embodiments described below are suitable specific examples, and various technically preferable limitations are applied, but the scope of the disclosure is not limited to these modes unless they are specifically described in the following description as limiting the disclosure.

Figure 1:
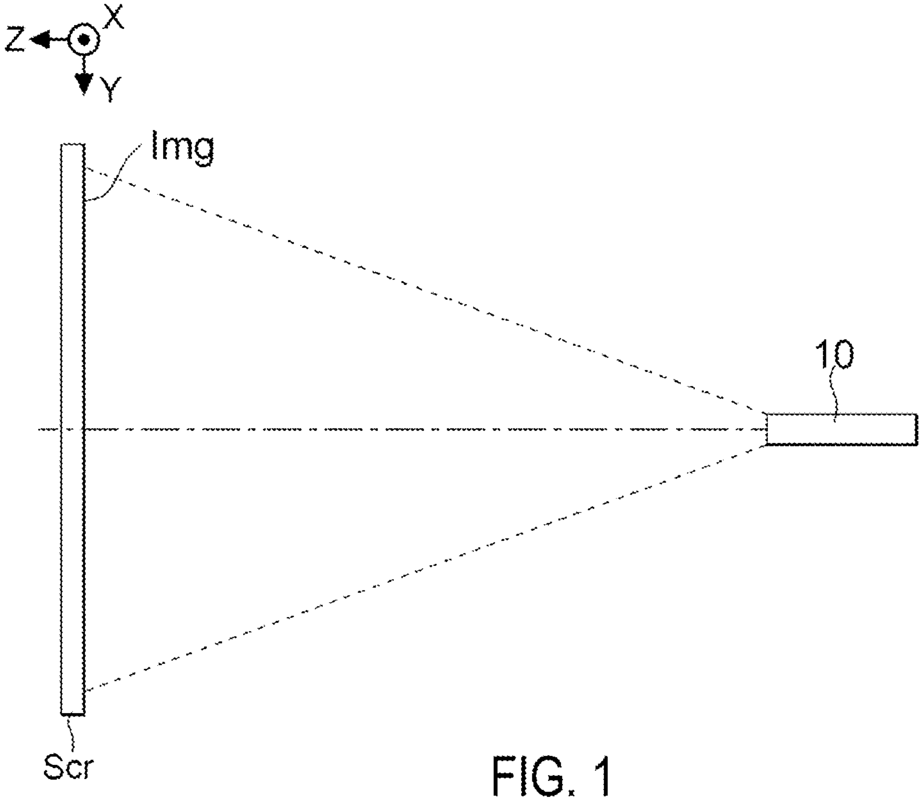
FIG. 1 is a diagram illustrating a projection device according to a first embodiment.
Figure 2:
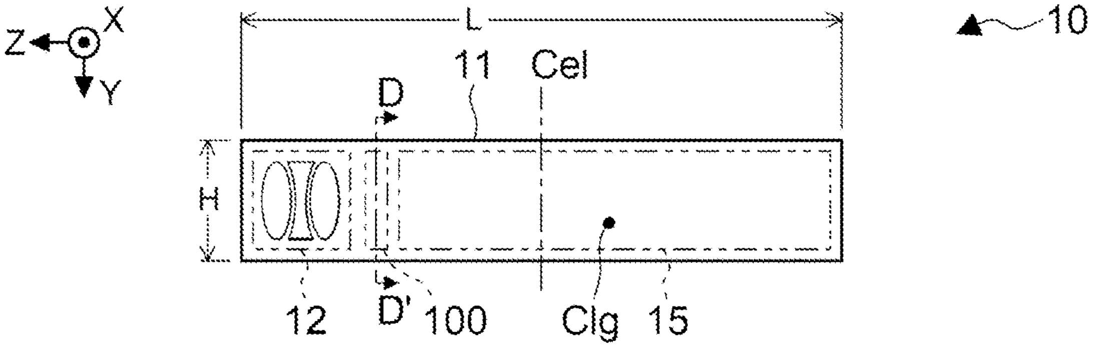
FIG. 2 is a diagram illustrating an arrangement of elements of the projection device.

FIG. 1 is a diagram illustrating a configuration of a projection device 10 according to a first embodiment. FIG. 2 is a diagram illustrating an arrangement of elements of the projection device 10.

As illustrate in FIG. 1, the projection device 10 is a pen-type device that projects an image to a screen Scr. The projection device 10 is a small lightweight device that can perform high-luminance projection, that is highly portable, and that is easily installed.

In the drawing, an X direction is a left direction of a projection image Img when the projection image Img is correctly projected to the screen Scr, and a Y direction is a downward direction of the projection image Img. A Z direction is an emission direction of the projection image Img in the projection device 10.

As illustrate in FIG. 2, in the projection device 10 according to the first embodiment, a power supply unit 15, a display panel 100, and a projection lens 12 are accommodated in a tubular housing 11 in this order along the Z direction. In other words, when viewed from a direction opposite to the Z direction, the projection lens 12, the display panel 100, and the power supply unit 15 are linearly arranged along the Z direction so as to overlap each other in the housing 11.

The display panel 100 is a micro-display that generates a color image based on video data supplied from a host device and emits the color image in the Z direction. In the embodiment, a single plate including an organic light-emitting diode (OLED) as a light-emitting element is used as the display panel 100. Regarding the display panel 100, a plurality of pixel circuits and a drive circuit driving the pixel circuits are formed at a semiconductor substrate. The semiconductor substrate is typically a silicon substrate, but may be a different semiconductor substrate.

The projection lens 12 is actually a combination of one or more lenses and enlarges and projects a color image generated at the display panel 100 to the screen Scr. The power supply unit 15 is a power supply of the display panel 100. The power supply unit 15 includes, for example, a secondary battery that can be repeatedly charged and discharged.

A center of gravity Clg of the projection device 10 is located in a direction opposite to the Z direction relative to a center Cel of the housing 11 along the Z direction. In practice, the user mostly uses the projection device 10 with the projection device 10 facing upward. Since the center of gravity Clg is located in the direction opposite to the projection direction, it is possible to lessen a burden on the wrist of the user.

Figure 3:
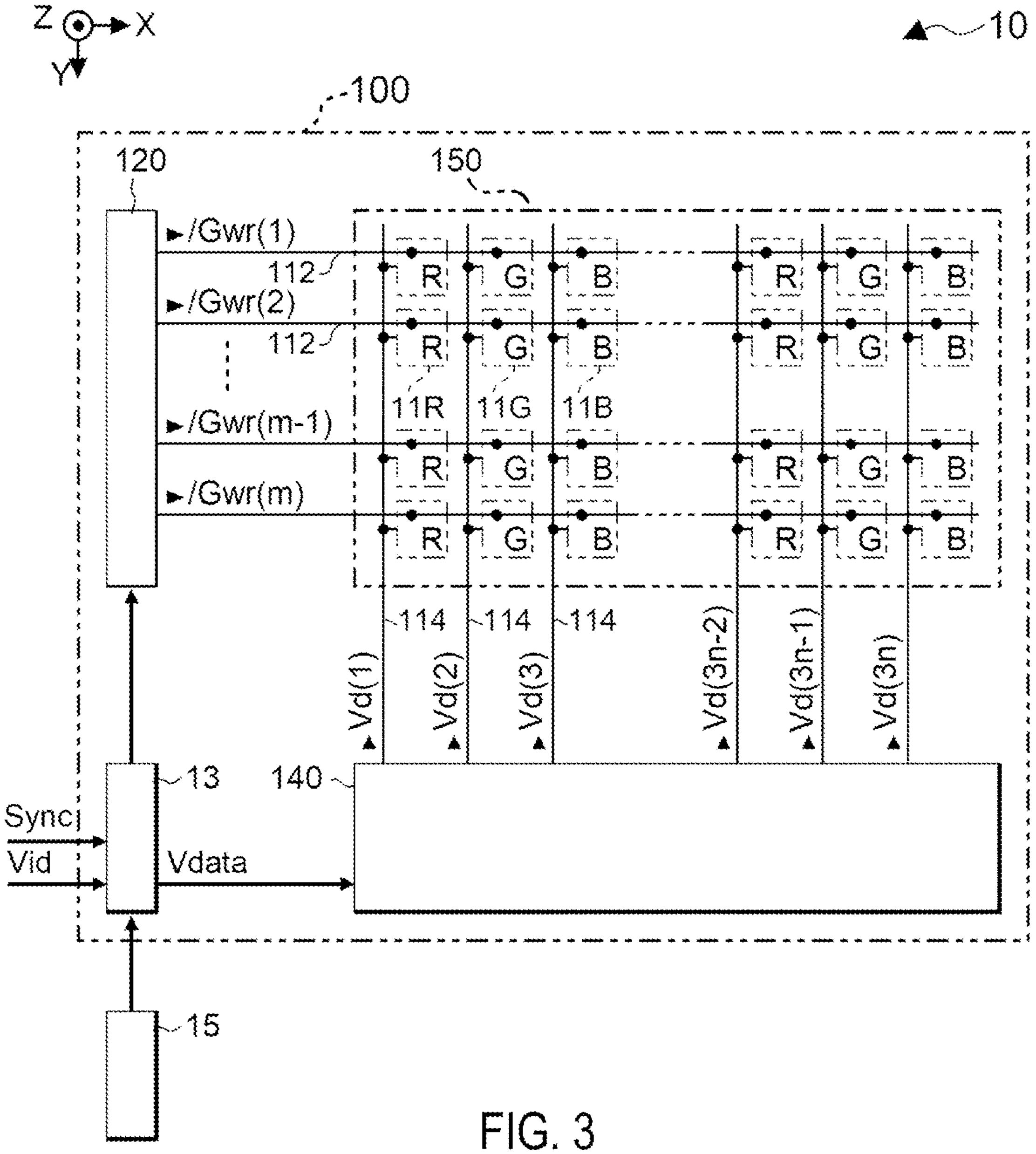
FIG. 3 is a block diagram illustrating a configuration of a display panel of the projection device.

FIG. 3 is a diagram illustrating an electrical configuration of the projection device 10. The display panel 100 is broadly divided into a control circuit 13, a scanning line drive circuit 120, a data signal output circuit 140, and a display region 150, and these elements are provided at a semiconductor substrate.

In the display region 150, scanning lines 112 in m rows are provided along the X direction, and data lines 114 in 3*n* columns are provided along the Y direction so as to be electrically insulated from the respective scanning lines 112. Each of m and n is an integer equal to or greater than 2.

To distinguish the rows of the scanning lines 112, the rows may be referred to as first, second, . . . , (m-1)-th, and m-th rows in this order from the top in the drawing. Note that, for general description of the scanning lines 112 without specification of the rows, a row may be referred to as an i-th row, where i is an integer of 1 or more and m or less. Similarly, to distinguish the columns of the data lines 114, the columns may be referred to as first, second, third, . . . , (3n-2)-th, (3n-1)-th, and (3n)-th columns in this order from the left in the drawing. The data lines 114 in every three columns are grouped. Here, to generalize and describe the group, an integer j, which is 1 or more and n or less, is used, and a j-th group from the left includes the data lines 114 in three columns of the (3j-2)-th, (3j-1)-th, and (3j)-th columns.

Sub-pixels 11R, 11G, and 11B are provided corresponding to the scanning lines 112 arranged in the m rows and the data lines 114 arranged in the 3n columns. In detail, the sub-pixel 11R is provided corresponding to an intersection between the scanning line 112 in the i-th row and the data line 114 in the (3j-2)-th column.

The sub-pixel 11G is provided corresponding to an intersection between the scanning line 112 in the i-th row and the data line 114 in the (3j-1)-th column. The sub-pixel 11B is provided corresponding to an intersection between the scanning line 112 in the i-th row and the data line 114 in the (3j)-th column.

Light emitted from the sub-pixel 11R includes a red component, light emitted from the sub-pixel 11G includes a green component, and light emitted from the sub-pixel 11B includes a blue component. One color is expressed by additive color mixture of light emitted from the sub-pixels 11R, 11G, and 11B. Thus, in the display panel 100, color pixels are arranged in the m vertical rows×the n horizontal columns.

The control circuit 13 controls each unit based on video data Vid and a synchronization signal Sync supplied in a wired or wireless manner from a host device (omitted in the figure). Specifically, the control circuit 13 generates various control signals to control each unit.

The video data Vid designates, for example, a gradation level of a pixel to be displayed by 8 bits.

The synchronization signal Sync includes a vertical synchronization signal that instructs a start of vertical scanning of the video data Vid, a horizontal synchronization signal that instructs a start of horizontal scanning, and a dot clock signal that indicates a timing of one pixel of the video data.

The power supply unit 15 supplies power to the control circuit 13, the scanning line drive circuit 120, and the data signal output circuit 140 using a secondary battery as a power source. The power supply unit 15 also performs, for example, control when charging the secondary battery.

The scanning line drive circuit 120 is a circuit for driving, for each row, the sub-pixels 11R, 11G, and 11B arranged in the m rows and 3*n* columns according to control by the control circuit 13. For example, the scanning line drive circuit 120 sequentially supplies scanning signals /Gwr(1), /Gwr(2), . . . , /Gwr(m-1), and /Gwr(m) to the scanning lines 112 in the first, second, third, . . . , (m-1)-th, and m-th rows. Generally, the scanning signal supplied to the scanning line 112 in the i-th row is denoted as /Gwr(i).

The data signal output circuit 140 is a circuit that outputs, according to control by the control circuit 13, data signals via the data lines 114 to the sub-pixels 11R, 11G, and 11B located in a row selected by the scanning line drive circuit 120. The data signal is a voltage signal obtained by converting the 8-bit video data Vdata into analog data. That is, the data signal output circuit 140 converts the video data Vdata of one row corresponding to the sub-pixels 11R, 11G, and 11B in the first to (3n)-th columns in the selected row into analog data and outputs the analog data to the data lines 114 in the first to (3n)-th columns.

In the drawings, the data signals output to the data lines 114 in the first, second, third, . . . , (3n-2)-th, (3n-1)-th, and (3n)-th columns are referred to as Vd(1), Vd(2), Vd(3), . . . , Vd(3n-2), Vd(3n-1), and Vd(3n), respectively. In general, a data signal output to the data line 114 in the j-th column is denoted as Vd(j).

The sub-pixels 11R, 11G, and 11B have the same electrical configuration.

Regarding the electrical configuration of each of the sub-pixels 11R, 11G, and 11B, the sub-pixel 11R in the i-th row and the (3j-2)-th column will be described as a representative.

Figure 4:
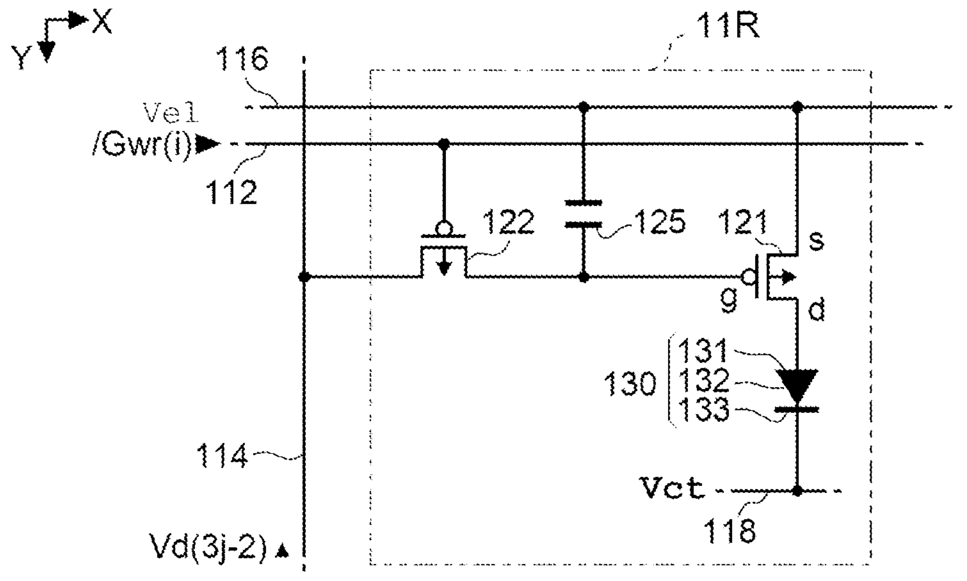
FIG. 4 is a diagram illustrating a configuration of pixels of the display panel.

FIG. 4 is a circuit diagram illustrating an electrical configuration of the sub-pixel 11R. As illustrated in the drawing, the sub-pixel 11R includes P-channel MOS-type transistors 121 and 122, a capacitive element 125, and an OLED 130.

The OLED 130 is an example of a light-emitting element in which a light-emitting layer 132 is sandwiched between a pixel electrode 131 and a common electrode 133. The pixel electrode 131 functions as an anode, and the common electrode 133 functions as a cathode. When a current flows from the anode to the cathode, holes injected from the anode and electrons injected from the cathode are recombined in the light-emitting layer 132 to generate excitons, and the OLED 130 generates white light.

The generated white light resonates in an optical resonator including a reflective electrode and a semireflective semitransparent layer (omitted in FIG. 3), and then, in the case of the sub-pixel 11R, light is emitted at a resonance wavelength set corresponding to red. A colored layer corresponding to red is provided on the light emission side of the optical resonator. Thus, the light emitted from the OLED 130 is visually recognized by an observer through the optical resonator and the colored layer.

In addition, in the case of the sub-pixel 11G, light is emitted at a resonance wavelength set corresponding to green and is visually recognized by the observer through a colored layer corresponding to green, and in the case of the sub-pixel 11B, light is emitted at a resonance wavelength set corresponding to blue and is visually recognized by the observer through a colored layer corresponding to blue.

In the transistor 121 of the sub-pixel 11R in the i-th row and the (3j-2)-th column, a gate node g is coupled to a drain node of the transistor 122, a source node is coupled to a feed line 116 of a voltage Vel, and a drain node is coupled to the pixel electrode 131 that is an anode of the OLED 130. In the transistor 122 of the sub-pixel 11R in the i-th row and the (3j-2)-th column, a gate node is coupled to the scanning line 112 in the i-th row, and a source node is coupled to the data line 114 in the (3j-2)-th column. The common electrode 133 which functions as a cathode of the OLED 130 is coupled to a feed line 118 of a voltage Vct. Further, since the display panel 100 is formed at a silicon substrate, a substrate potential of each of the transistors 121 and 122 is set to a potential corresponding to, for example, the voltage Vel.

Figure 5:
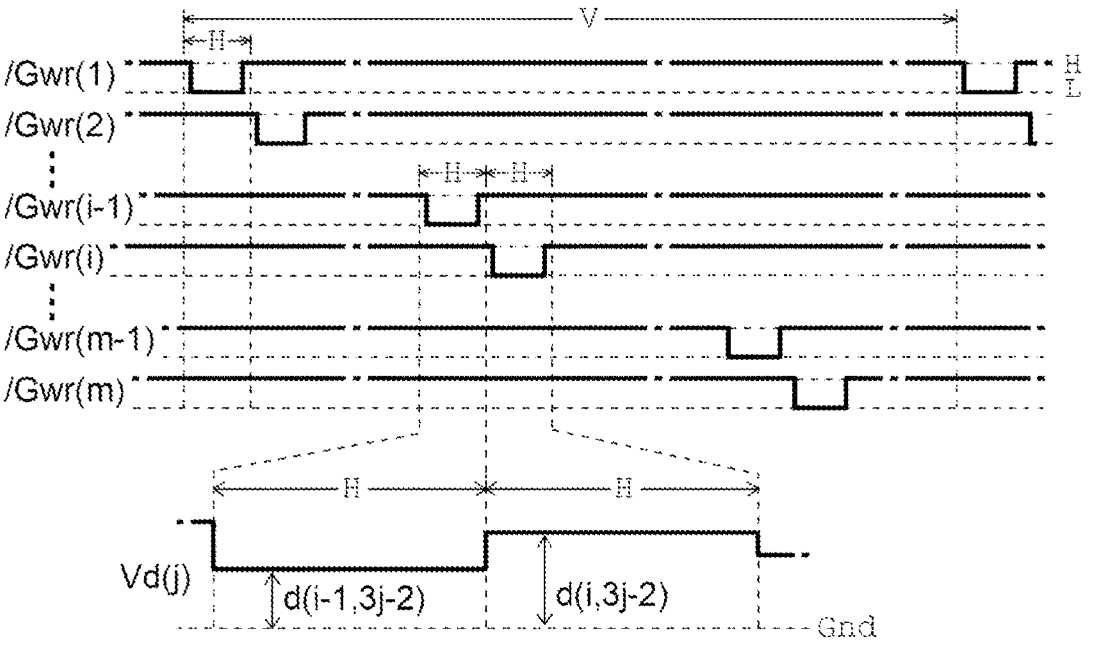
FIG. 5 is a diagram illustrating an operation of the display panel.

FIG. 5 is a timing chart for describing an operation of the display panel 100.

In the display panel 100, the scanning lines 112 in the m rows are scanned one by one in the order of the first, second, third, . . . , m-th rows during a period of a frame (V). In detail, as illustrated in the drawing, the scanning signals /Gwr(1),/Gwr(2), . . . , /Gwr(m-1), and /Gwr (m) successively and exclusively reach an L level in each horizontal scanning period (H) by the scanning line drive circuit 120. In the embodiment, periods during which the adjacent scanning signals among the scanning signals /Gwr(1) to /Gwr(m) reach the L level are temporally isolated. Specifically, after the scanning signal /Gwr(i-1) changes from the L level to a H level, the next scanning signal /Gwr(i) reaches the L level after a period of time. This period corresponds to a horizontal retrace period.

In the present description, the period of one frame (V) refers to a period required to display one frame of an image designated by the video data Vid. When a length of the period of one frame (V) is the same as a vertical synchronization period, for example, when a frequency of a vertical synchronization signal included in the synchronization signal Sync is 60 Hz, the length is 16.7 milliseconds which corresponds to one cycle of the vertical synchronization signal. In addition, the horizontal scanning period (H) is an interval of time in which the scanning signals /Gwr(1) to /Gwr(m) reach the L level in order, but in the drawing, for convenience, a start timing of the horizontal scanning period (H) is substantially a center of the horizontal retrace period.

When a certain scanning signal among the scanning signals /Gwr(1) to /Gwr(m), for example, the scanning signal/Gwr(i) supplied to the scanning line 112 in the i-th row reaches the L level, speaking of the (3j-2)-th column, the transistor 122 in the sub-pixel 11R in the i-th row and the (3j-2)-th column is in an ON state. Thus, the gate node g of the transistor 121 in the sub-pixel 11R is electrically coupled to the data line 114 in the (3j-2)-th column.

In the present description, the "On state" of the transistor means that a part between the source node and the drain node in the transistor is electrically closed and the transistor is in a low impedance state. Also, an "OFF state" of the transistor means that the part between the source node and the drain node electrically opens and the transistor is in a high impedance state.

Also, in the description, "electrically coupled" or simply "coupled" means a state in which two or more elements are directly or indirectly coupled or bonded. "Electrically non-coupled" or simply "non-coupled" means a state in which the two or more elements are not directly or indirectly coupled or bonded.

In the horizontal scanning period (H) in which the scanning signal /Gwr(i) reaches the L level, the data signal output circuit 140 converts the gradation levels of the sub-pixels in the i-th row and the first column to the i-th row and the (3n)-th column indicated by the video data Vdata into analog data signals Vd(1) to Vd(3n), and outputs the analog data signals to the data lines 114 in the first to the (3n)-th columns. In the (3j-2)-th column, the data signal output circuit 140 converts the gradation level d(i, 3j-2) of the pixel in the i-th row and the (3j-2)-th column into an analog data signal Vd(j), and outputs the data signal to the data line 114 in the (3j-2)-th column.

In the horizontal scanning period (H) in which the scanning signal /Gwr(i-1) one line before the scanning signal /Gwr(i) reaches the L level, the data signal output circuit 140 converts the gradation level d(i-1, 3j-2) of the sub-pixel in the (i-1)-th row and the (3j-2)-th column to an analog data signal Vd(3j-2), and outputs the data signal to the data line 114 in the (3j-2)-th column.

The data signal Vd(3j-2) is applied to the gate node g of the transistor 121 in the sub-pixel 11R in the i-th row and the (3j-2)-th column via the data line 114 in the (3j-2)-th column, and the voltage of the data signal Vd(3j-2) is retained by the capacitive element 125. Thus, the transistor 121 causes a current corresponding to the voltage between the gate node and the source node to flow to the OLED 130. Even when the scanning signal Gwr(i) reaches the H level and the transistor 122 is in the OFF state, the voltage of the data signal Vd(3j-2) is retained by the capacitive element 125, and thus the current continues to flow in the OLED 130. Thus, in the sub-pixel 11R in the i-th row and the (3j-2)-th column, the OLED 130 continues to emit light with the voltage retained by the capacitive element 125, that is, a brightness corresponding to the gradation level until the period of one frame (V) elapses and the transistor 122 is turned on again and the voltage of the data signal is applied again.

Although the sub-pixel 11R in the i-th row and the (3j-2)-th column has been described here, the OLEDs 130 in the i-th row and columns other than the (3j-2)-th column also emit light with the luminance indicated by the video data Vdata.

Also, the OLED 130 of each of the sub-pixels 11R, 11G, and 11B in rows other than the i-th row also emits light with the luminance indicated by the video data Vdata by the scanning signals/Gwr(1) to /Gwr(m) reaching the L level in order. Thus, in the display panel 100, during the period of one frame (V), the OLED 130 in each of all the sub-pixels 11R, 11G, and 11B in the first row and the first column to the m-th row and the (3n)-th column emits light with the luminance indicated by the video data Vdata, and thus an image of one frame is displayed.

Figure 6:
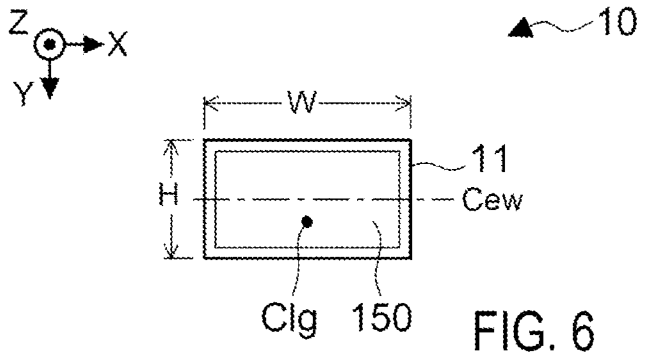
FIG. 6 is a diagram illustrating an example of a cross section of a display region of the display panel and a housing.

FIG. 6 is a cross-sectional view of the projection device 10 taken along line D-D' in FIG. 2 and illustrates the relationship between the housing 11 and the display region 150 of the display panel 100. As illustrate in this drawing, in the embodiment, the cross section of the tubular housing 11 has a rectangle shape that is substantially the same as the shape of the display region 150. The maximum diameter of the housing 11 in the X direction (width in the horizontal direction) is W, the maximum diameter in the Y direction (length in the vertical direction) is H, and the length in the Z direction is L as illustrate in FIG. 2.

In the embodiment, the housing 11 is designed so as to satisfy the following conditions in consideration of the size of the display region 150 of the display panel 100 to be accommodated, the ease of holding the housing 11, and the like.

$$H \geq 5.0 \text{ mm},$$

$$W \leq 30 \text{ mm},$$

$$L \geq 40 \text{ mm},$$

$$W/H \leq 2.0, \text{ and}$$

$$L/W \geq 3.0.$$

A diagonal length of the display region 150 is 0.21 inches or more and 0.4 inches or less, a luminance (luminous intensity per unit area) of the display region 150 is 2 million nits or more, and a luminous intensity (a value obtained by multiplying the luminance by the area of the display region 150) of the display region 150 is 25 cd or more.

The light flux emitted from the projection lens 12 is 4000 lumens (lm) or less.

When the area of the display region 150 is denoted as S ($m^2$), the light flux is $2.3\times10^7\times S$ or less.

When the capacity of the secondary battery of the power supply unit 15 is prioritized, the following may be satisfied:

$$L \geq 50 \text{ mm, and}$$

$$L/W \geq 4.0.$$

In this embodiment, the degree of polarization of the projection image is 20% or less, more preferably 10% or less. A projection image of a related-art projection device using a reflecting optical system includes a polarized component. Thus, when the user wears polarizing glasses, the appearance significantly deteriorates. On the other hand, in the embodiment, since the degree of polarization of the projection light is 20% or less, even when the user wears polarizing glasses, deterioration of the appearance can be suppressed.

The cross-sectional shape of the housing 11 of the projection device 10 is not limited to the rectangular shape illustrated in FIG. 6. For example, the cross-sectional shape of the housing 11 may be an ellipse as illustrate in FIG. 7, or may be a circle as illustrate in FIG. 8 as long as the display region 150 is square.

Figure 7:
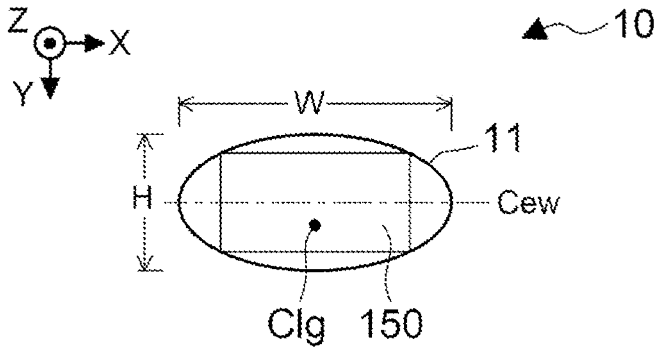
FIG. 7 is a diagram illustrating an example of the cross section of the display region of the display panel and the housing.
Figure 8:
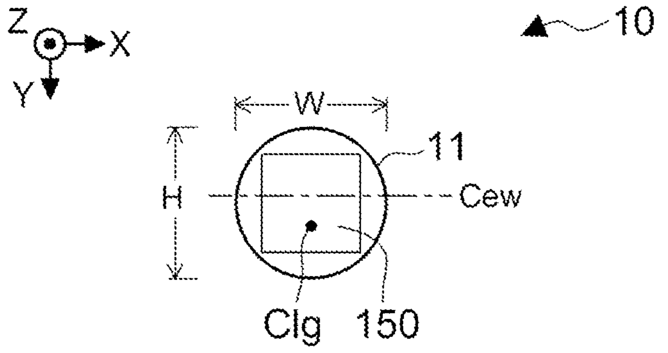
FIG. 8 is a diagram illustrating an example of the cross section of the display region of the display panel and the housing.

When the cross-sectional shape of the housing 11 is an ellipse as illustrated in FIG. 7 or a circle as illustrated in FIG. 8, the center of gravity Clg of the projection device 10 may be positioned in the Y direction, that is, downward in a state where the Y direction of the display region 150 coincides with the gravity direction. In detail, the center of gravity Clg may be positioned in the Y direction relative to the center Cew of the housing 11 in the height direction. By positioning the center of gravity in this way, when the projection device 10 is placed at a flat surface, it is easy to suppress rolling and stabilize the projection device 10.

Even when the cross section of the housing 11 is rectangular, the projection device 10 is stabilized by positioning the center of gravity Clg downward.

In the projection device 10 according to the first embodiment, the projection lens 12, the display panel 100, and the power supply unit 15 are linearly arranged along the Z direction in the tubular housing 11, and thus the projection device 10 is portable and can be easily miniaturized.

Figure 9:
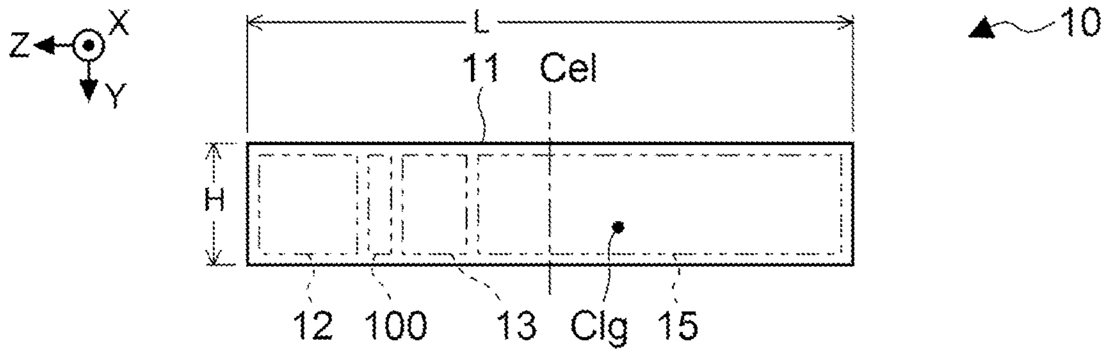
FIG. 9 is a diagram illustrating an arrangement of elements of a projection device according to a second embodiment.
Figure 10:
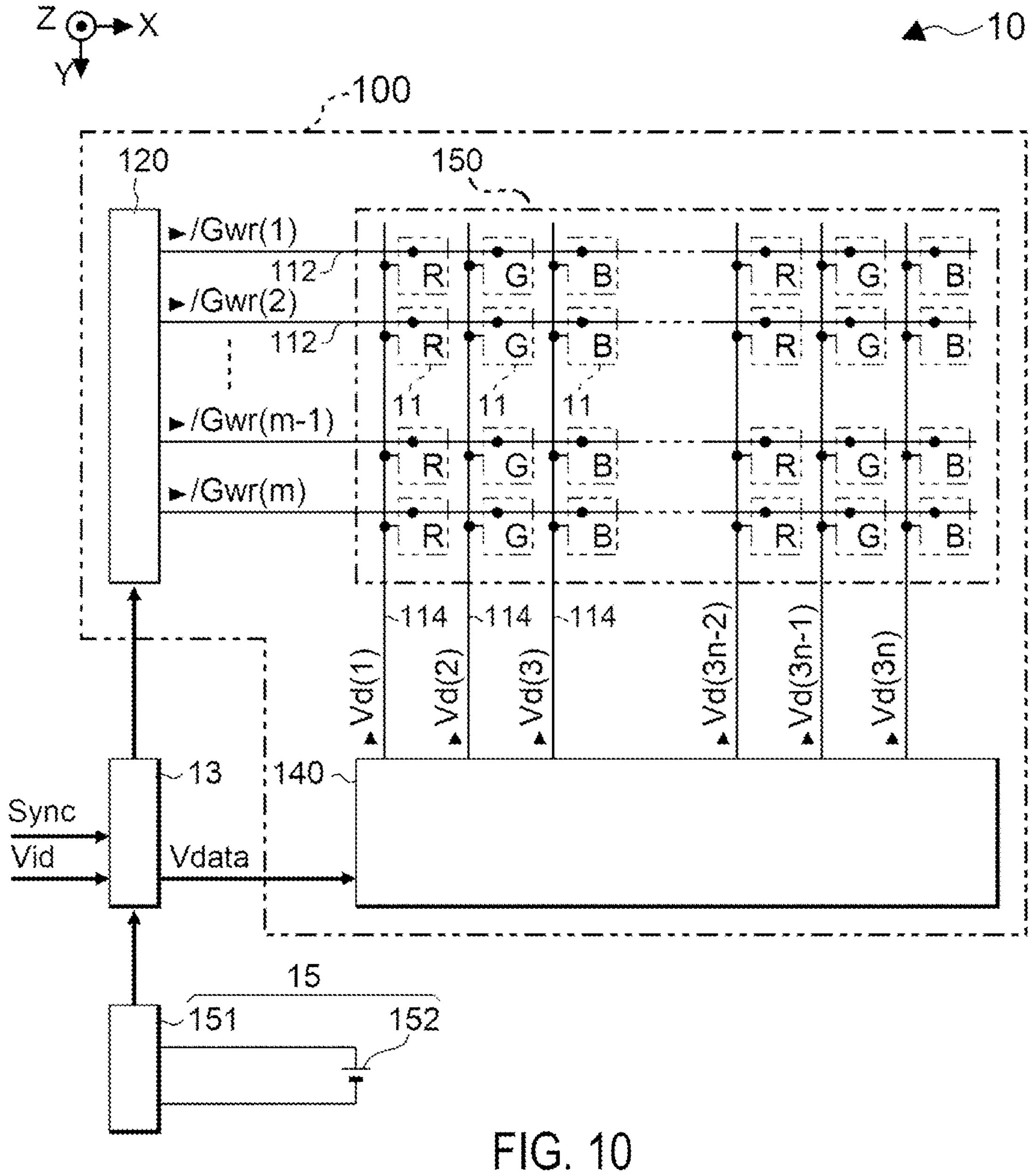
FIG. 10 is a block diagram illustrating a configuration of a display panel of the projection device.

FIG. 9 is a diagram illustrating an arrangement of elements of a projection device 10 according to a second embodiment. FIG. 10 is a diagram illustrating an electrical configuration of the projection device 10.

As illustrate in FIG. 9, in the second embodiment, the power supply unit 15, the control circuit 13, the display panel 100, and the projection lens 12 are accommodated in the tubular housing 11 in this order along the Z direction. In other words, when viewed from a direction opposite to the Z direction, the projection lens 12, the display panel 100, the control circuit 13, and the power supply unit 15 are linearly arranged along the Y direction so as to partially overlap each other in the housing 11.

In the second embodiment, the power supply unit 15 is divided into a power supply control circuit 151 and a battery 152. The control circuit 13 is extracted as a separate body from the display panel 100.

In the projection device 10 according to the second embodiment, the power supply unit 15, the control circuit 13, the display panel 100, and the projection lens 12 are also linearly arranged along the X direction in the tubular housing 11, as in the first embodiment. Thus, the projection device 10 is portable and can be easily miniaturized.

In addition, in the second embodiment, since the control circuit 13 is extracted from the display panel 100 and configured as a separate body, it is possible to miniaturize the display panel 100 as compared to the first embodiment.

In the first embodiment, the display panel 100 is coupled to the power supply unit 15 via, for example, a flexible printed circuit (FPC) board. In the second embodiment, the display panel 100 is coupled to the control circuit 13 and the power supply control circuit 151 via an FPC board. In the above coupling, coupling between the display panel 100 and the FPC board is considered to have, for example, the following modes.

Figure 11:
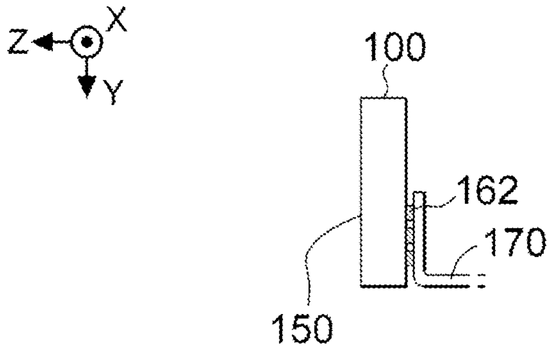
FIG. 11 is a diagram illustrating a coupling mode between the display panel and an FPC board.

As illustrated in FIG. 11, a plurality of electrodes 162 may be provided at the back surface (the surface in the direction opposite to the Z direction) of the display panel 100 that is a semiconductor substrate, and the plurality of electrodes 162 may be coupled to terminals of the FPC board 170. The plurality of electrodes 162 are electrically conductive to wirings formed at the surface (the surface in the Z direction) of the display panel 100 via holes vertically extending through the substrate of the display panel 100.

Figure 12:
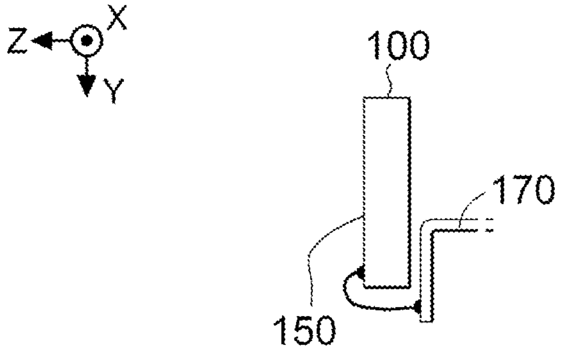
FIG. 12 is a diagram illustrating a coupling mode between the display panel and the FPC board.

As illustrate in FIG. 12, an electrode formed at the surface of the display panel 100 that is a semiconductor substrate and a terminal of the FPC board 170 may be coupled by wire bonding. After the wire bonding, the coupling portion may be covered with an insulating resin for protection of the coupling portion.

Figure 13:
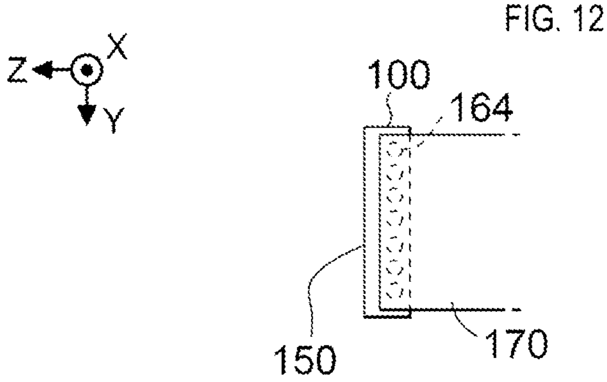
FIG. 13 is a diagram illustrating a coupling mode between the display panel and the FPC board.

As illustrated in FIG. 13, a configuration may be employed in which a plurality of electrodes 164 are provided at a side end portion of the display panel 100, and the plurality of electrodes 164 may be coupled to terminals of the FPC board 170. Note that the plurality of electrodes 164 are electrically conductive to wirings formed at the surface of the display panel 100.

Figure 14:
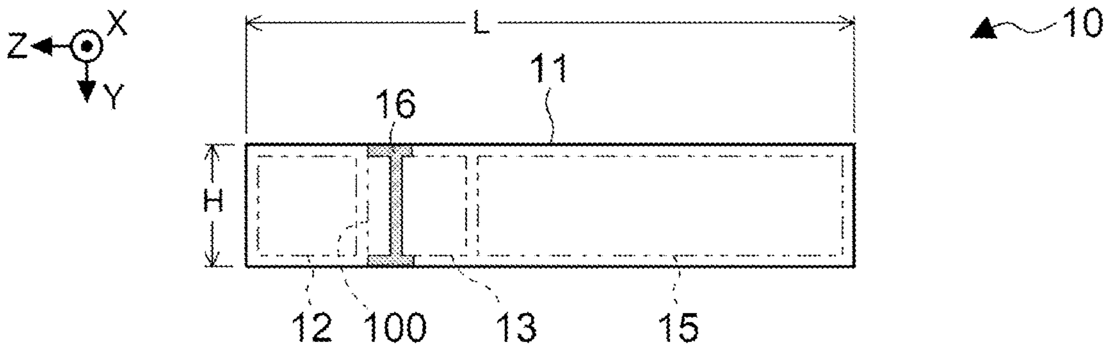
FIG. 14 is a diagram illustrating an arrangement of elements of a projection device according to a third embodiment.

FIG. 14 is a diagram illustrating an arrangement of elements of a projection device 10 according to a third embodiment. As illustrate in the drawing, a heat dissipation member 16 is provided between the display panel 100 and the control circuit 13.

Figure 15:
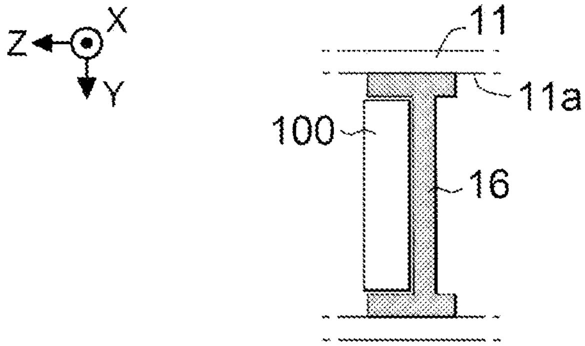
FIG. 15 is a diagram illustrating a display panel and a heat dissipation member of the projection device.

FIG. 15 is a partially enlarged view of the heat dissipation member 16 and the display panel 100 in FIG. 14. The heat dissipation member 16 is made of, for example, aluminum, and is in contact with an internal wall 11*a* of the housing 11 as illustrate in FIG. 14 in a state where the heat dissipation member 16 accommodates the rear surface of the display panel 100. Thus, since heat generated in the display panel 100 is transferred to the heat dissipation member 16 and the housing 11, overheating of the display panel 100 is appropriately suppressed.

The first embodiment, the second embodiment, and the third embodiment (hereinafter, referred to as embodiments and the like) that have been described above as examples can be variously modified. Specific modification modes that may be applied to the embodiments will be described below as examples. Two or more modes freely selected from the following examples may be combined to the extent that these mode do not contradict with each other.

In the display panel 100 according to the embodiments and the like, only the transistors 121 and 122 are included in each of the sub-pixels 11R, 11G, and 11B. However, a transistor for performing threshold compensation of the transistor 121, a transistor for resetting the pixel electrode 131 that is an anode of the OLED 130, and a transistor for performing interruption and/or control of interruption of the OLED 130 may be separately provided.

In the embodiments and the like, the OLED 130 has been described as an example of a light-emitting element, but another light-emitting element may be used. Examples of the light-emitting element include a light-emitting diode (LED), a mini LED, and a micro LED.

According to each embodiment, it is possible to achieve the small lightweight projection device 10 that can perform high-luminance projection, that is highly portable, and that can be easily installed. Thus, it is possible to achieve, for example, a projection method and a system illustrate in FIGS. 16 to 18.

Figure 16:
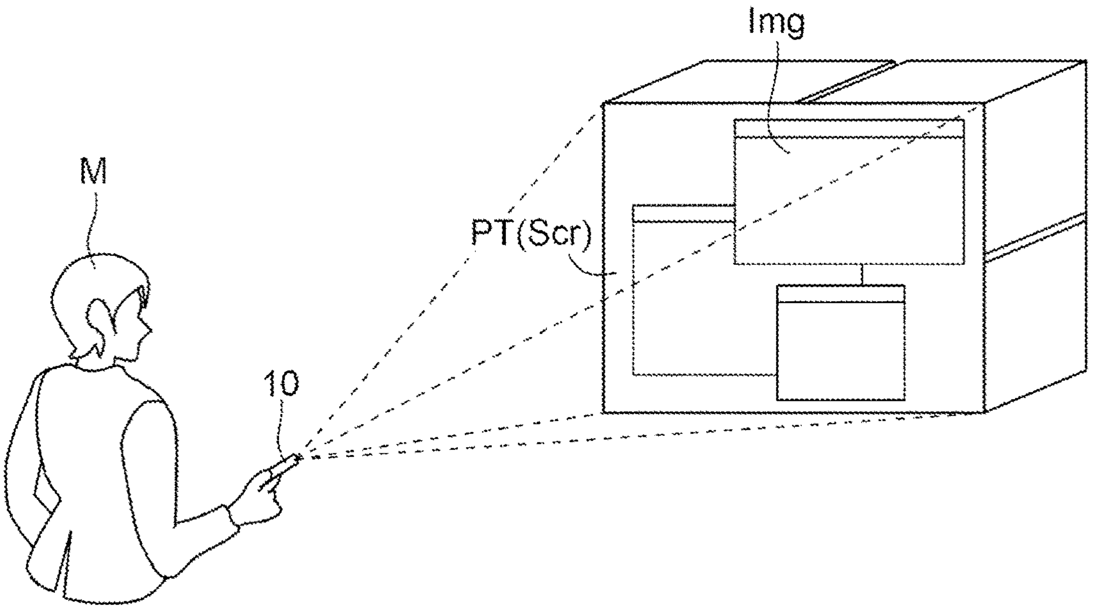
FIG. 16 is a diagram illustrating an example of use of the projection device.

As illustrated in FIG. 16, a viewer M who is a user holds the projection device 10 in the hand and directs the projection device 10 toward a projection target PT, thereby enabling a mode in which the surface of a projection target PT can be used as the screen Scr to display a projection image Img. In addition, it is possible to improve the quality of the display image by detecting the position of the screen Scr and sensing the shape of the projection surface by using a camera. Further, a photodetector can be incorporated in the display panel 100, so that the same function as a camera can be achieved.

Figure 17:
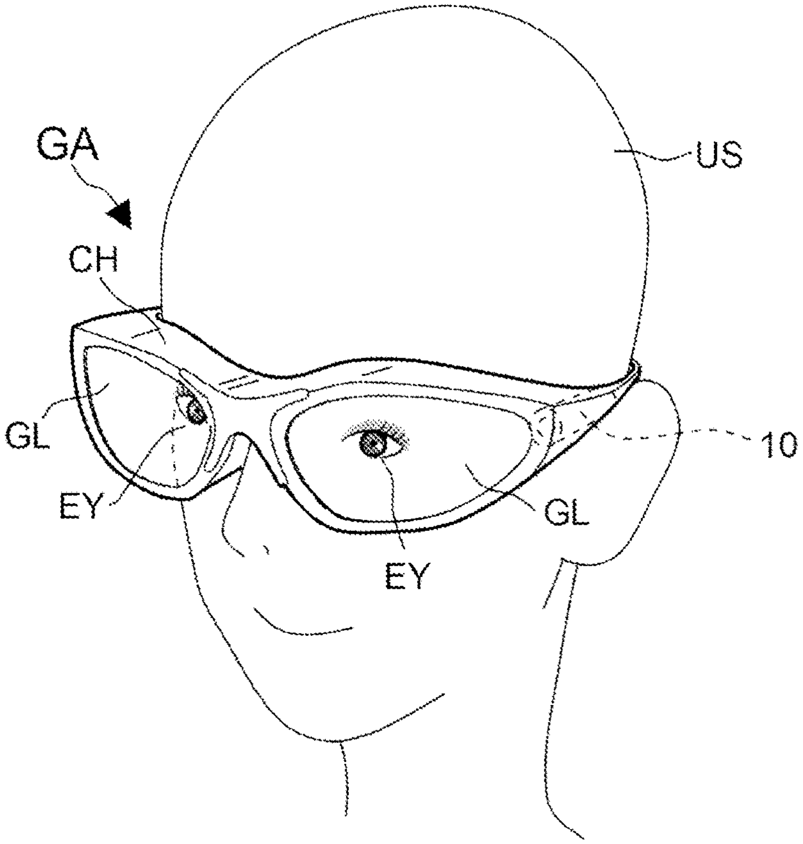
FIG. 17 is a diagram illustrating an example of use of the projection device.

As illustrated in FIG. 17, a mode can be achieved in which the projection device 10 can be easily installed at glasses GA worn by an observer or a wearer US, and an image is projected at a real space at which the observer or the wearer US looks. Further, by adding a switching mechanism CH capable of projecting the projection image from the projection device 10 to glass lenses GL of the glasses GA, the glasses GA can be configured as a head-up display.

Figure 18:
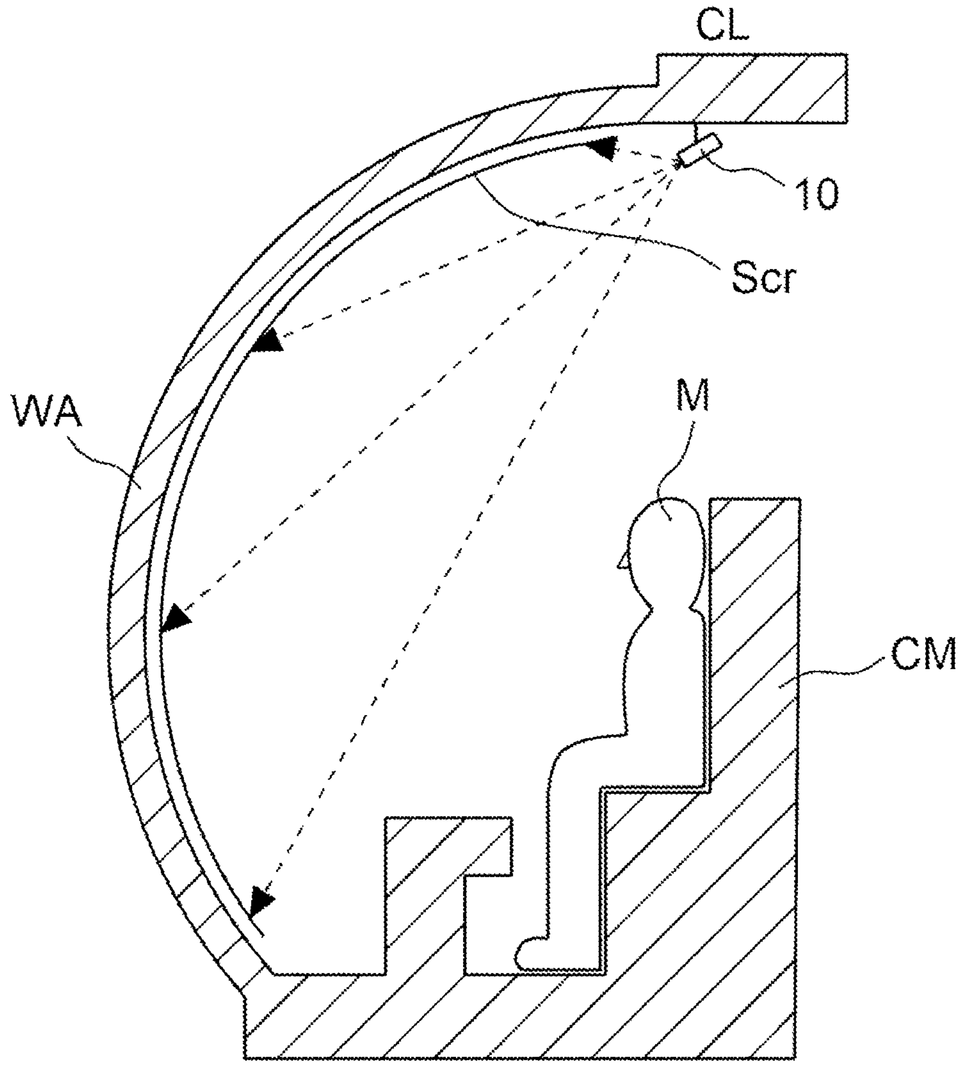
FIG. 18 is a diagram illustrating an example of use of the projection device.

As illustrated in FIG. 18, the degree of flexibility in installation of the projection device 10 for the viewer M increases, and the installation is facilitated. A plurality of the projection devices 10 can be easily installed at a seat portion CM and a ceiling CL of the viewer M, and the viewer M can visually recognize an image using a wall WA as the screen Scr. The seat portion CM can be a driver's seat of an automobile, or the like.

An outline of calculation of numerical values in each embodiment is as follows.

(1) When portability is prioritized, the diameter of the projection optical system is ideally 30 mm or less. When the frame thickness of the projection lens is substantially 15% of the lens system, the lens diameter is substantially 20 mm, and thus the diagonal length of the display region of the display panel 100 is 20 mm (0.8 inches) or less.

(2) The number of pixels of the display panel 100 is, for example, 1920×1080 dots in the case of FHD and 1024×768 dots in the case of XGA, and a rectangular shape is formed. In order to efficiently dissipate heat from the end portion and the frame end of the display panel 100 to the housing, it is preferable to narrow the distance between the frame and the housing. In this case, the cross section of the housing may be elliptical or rectangular.

(3) In a case where the projection device is used while being held in the hand, when the housing has an elliptical shape along the outer shape of the display panel, the long side preferably has a length of 25 mm or less from the viewpoint of ease of holding. In this case (the minor axis (H) has a length of 7 mm or more), the major axis (W) preferably has a length of 25 mm or less. Preferably, W/H≤2.

(4) In a case where a laser pointer or the like is used while being held in the hand, when the housing has a rectangular shape along the outer shape of the panel, the long side preferably has a length of 20 mm or less from the viewpoint of ease of holding. In this case, preferably, the short side (H) has a length of 5 mm or more, and the long side (W) has a length of 20 mm or less. Preferably, W/H≥2.

(5) In a case where the projection device is operated while being held in the hand, the length suitable for being held in the hand is ideally 50 mm or more, and the center of gravity is preferably located behind the center portion.

(6) Preferably, the length of the housing/the diagonal size of the display panel 4.

(7) The light flux of an existing picoprojector needs to be at least 80 lm. When the diagonal length of the display panel 100 is 0.2 inches, a luminance of 2000,000 nits or more is required to achieve 80 lm. In this case, the luminous intensity is 25 cd or more.

Preferred aspects of the present disclosure are understood from the above description, as follows. In the following, in order to facilitate understanding of each of the aspects, the reference signs of the drawings are provided in parentheses for convenience, but the present disclosure is not intended to be limited to the illustrated aspects.

A projection device (10) according to an aspect (first aspect) includes a display panel (100) configured to emit light from a plurality of light-emitting elements (130) in a predetermined direction (Z direction), a projection lens (12) configured to project the light emitted from the display panel (100) in the predetermined direction (Z direction), a power supply unit (15) configured to supply power to the display panel (100), and a housing (11) that is tubular, the housing (11) accommodating the power supply unit (15), the display panel (100), and the projection lens (12) in this order along the predetermined direction (Z direction).

According to the first aspect, the projection device 10 can be made portable and miniaturized.

In the projection device (10) according to a second aspect being a specific aspect of the first aspect, W≤30 mm, H≥5.0 mm, and L≥50 mm, where W is a maximum diameter of a cross section of the housing (11), H is a minimum diameter of the cross section of the housing (11), and L is a length of the housing (11) along the predetermined direction (Z direction). In the projection device (10) according to a third aspect being a specific aspect of the second aspect, W/H≤2.0 and L/W≥3.0.

In the projection device (10) according to a fourth aspect being a specific aspect of the first aspect, a center of gravity (Clg) is located in a direction opposite to the predetermined direction (Z direction) relative to a center of a length of the housing (11) along the predetermined direction (Z direction).

According to the fourth aspect, when the user uses the projection device (10) with the projection device (10) facing upward, the user can easily hold the projection device (10) and lessen a burden on the wrist.

In the projection device (10) according to a fifth aspect being a specific aspect of the first aspect, a center of gravity (Clg) is located in a gravity direction relative to a center of a cross-section of the housing (11).

According to the fifth aspect, when the projection device (10) is placed on a flat surface, it is possible to suppress rolling and stabilize the projection device (10).

The projection device (10) according to a sixth aspect being a specific aspect of the first aspect includes a heat dissipation member (16) provided between the display panel (100) and the power supply unit (15), wherein the heat dissipation member (16) is in contact with a surface of the display panel (100) in a direction opposite to the predetermined direction (Z direction) and an inner wall (11*a*) of the housing (11). According to the sixth aspect, heat generated in the display panel (100) is transferred to the heat dissipation member (16) and the housing (11), and thus overheating of the display panel (100) is appropriately suppressed.

What is claimed is:

1. A projection device comprising:

a display panel configured to emit light from a plurality of light-emitting elements, each light emitting element being configured to generate light;

a projection lens configured to project the light emitted from the display panel;

a power supply unit configured to supply power to the display panel;

a housing having a tubular shape extending in a predetermined direction;

a heat dissipation member provided between the display panel and the power supply unit; and a control circuit provided as a separate component from the display panel, wherein the heat dissipation member is in contact with a surface of the display panel in a direction opposite to the predetermined direction and an inner wall of the housing, the heat dissipation member being in contact with three sides of the display panel, the heat dissipation member is in contact with two opposing inner walls of the housing, and the housing accommodates the power supply unit, the control circuit, the heat dissipation member, the display panel, and the projection lens in this order along the predetermined direction.

2. The projection device according to claim 1, wherein $$W \leq 30 \text{ mm},$$

$$H \geq 5.0 \text{ mm, and}$$

$$L \geq 50 \text{ mm},$$

where

W is a maximum diameter of a cross section of the housing, H is a minimum diameter of the cross section of the housing, and L is a length of the housing along the predetermined direction.

3. The projection device according to claim 2, wherein $$W/H \leq 2.0, \text{ and}$$

$$L/W \geq 3.0.$$

4. The projection device according to claim 1, wherein a center of gravity of the projection device is located in a direction opposite to the predetermined direction relative to a center of a length, along the predetermined direction, of the housing.

5. The projection device according to claim 1, wherein a center of gravity of the projection device is located in a gravity direction relative to a center of a cross-section of the housing.

* * * * *